United States Patent [19]

Takebe et al.

[11] 3,919,185

[45] Nov. 11, 1975

[54] PROCESS FOR POLYMERIZING OLEFINS

[75] Inventors: Saburo Takebe, Tsuchiura; Toshizo Abe, Kurashiki; Nobuaki Goko, Tokyo; Sunao Ushio, Yokohama; Shigeo Go, Kurashiki, all of Japan

[73] Assignee: Mitsubishi Chemical Industries Ltd., Tokyo, Japan

[22] Filed: Jan. 12, 1973

[21] Appl. No.: 322,911

[30] Foreign Application Priority Data

Jan. 22, 1972 Japan............................... 47-8561

[52] U.S. Cl............ 260/93.7; 252/429 C; 260/94.3; 260/94.9 D; 260/94.9 DA; 260/94.9 E
[51] Int. Cl.$^2$ ............... C08F 10/02; C08F 10/04; C08F 4/16; C08F 4/24
[58] Field of Search......... 260/93.7, 94.9 E, 94.9 D, 260/94.9 C

[56] References Cited
UNITED STATES PATENTS

| | | | |
|---|---|---|---|
| 2,970,989 | 2/1961 | Hoxie | 260/94.9 E |
| 3,082,198 | 3/1963 | Klein | 260/94.9 C |
| 3,150,122 | 9/1964 | Andersen et al. | 260/94.9 C |
| 3,161,628 | 12/1964 | Dost et al. | 260/94.9 C |
| 3,234,383 | 2/1966 | Barney | 260/94.9 E |
| 3,483,274 | 12/1969 | Bucskai | 260/94.9 C |
| 3,544,533 | 12/1970 | Dreyfuss | 260/94.9 E |
| 3,595,849 | 7/1971 | Nakano et al. | 260/94.9 E |
| 3,637,627 | 1/1972 | Short et al. | 260/94.9 E |

FOREIGN PATENTS OR APPLICATIONS

| | | |
|---|---|---|
| 1,378,804 | 10/1964 | France |
| 222,426 | 6/1959 | Australia |
| 759,544 | 5/1967 | Canada |
| 1,436,974 | 3/1966 | France |
| 884,116 | 12/1961 | United Kingdom |

*Primary Examiner*—Edward J. Smith
*Attorney, Agent, or Firm*—Oblon, Fisher, Spivak, McClelland & Maier

[57] ABSTRACT

A process for polymerizing an olefin by a slurry polymerization technique in a nonpolar hydrocarbon diluent in the presence of a catalyst which comprises adding a modifier of a polyvalent metal salt of an organic acid with a molecular weight of at least 300.

11 Claims, No Drawings

PROCESS FOR POLYMERIZING OLEFINS

BACKGROUND OF THE INVENTION

1. Field of the Invention

This invention relates to a novel process for preparing polyolefins. More particularly, it relates to an improved process for preparing polyolefins by a slurry polymerization system.

2. Description of the Prior Art

Slurry polymerization systems have been known for the polymerization or copolymerization of olefins such as ethylene, propylene or butene-1, which precipitate as solids in a diluent. These systems are advantageous from an industrial viewpoint in comparison to solution polymerization systems because of the elimination of the polymer precipitation step, and the like.

If catalyst coefficiency is high, the step in which the catalyst is removed can be eliminated after the polymerization. Thus, the effectiveness of the slurry polymerization system is further increased. However, when ethylene is polymerized by the slurry polymerizing system, unexpected difficulties have occurred because of the facile deposition of films or blocks of the polymer on the surface of the inner walls of the reactor, and the stirrer, and other areas of the reaction system. In practice, the polymer which adheres to the inner surface of the reactor, decreases the heat-conductivity so that productivity is decreased and stable continuous operation of the system is disrupted. If a portion of the polymer, which adheres to the inner walls of the reactor or to the surface of the stirrer is peeled from the surface and mixed in the slurry of the polymer, the quality of the resulting polyolefin is adversely affected by factors such as the formation of fish-eyes, or the pipes of the apparatus are sealed, rendering the system inoperable. In order to eliminate these problems, the operation must be stopped and the apparatus must be cleaned. However, these difficulties render this method unsuitable from the viewpoint of workability, productivity and quality control.

A need, therefore, exists for a method which overcomes these difficulties associated with slurry polymerization systems. It has been found that the presence of a certain modifier in the slurry medium overcomes these difficulties.

SUMMARY OF THE INVENTION

One object of this invention is to provide a process for polymerizing an olefin in a slurry polymerization system wherein the resulting polymer does not adhere to the reactor or to pipes adjoining the reactor so as to allow long continuous operation of the system in order to provide high productivity and stable operating conditions.

It is another object of this invention to provide a process for preparing polyolefins whose product quality is not complicated by the presence of imperfections such as fish-eyes.

These objects and other objects of this invention as hereinafter will become apparent can be attained by a process for polymerizing an olefin by a slurry polymerization system in a diluent in the presence of a catalyst which comprises adding a modifier of a polyvalent metal salt of an organic acid having a total molecular weight greater than 300.

DESCRIPTION OF THE PREFERRED EMBODIMENT

In the invention, suitable starting olefins used for the polymerization can be ethylene, propylene, butene-1, 4-methylpentene-1, 1,3-butadiene, hexene-1, and mixtures thereof. Suitable diluents for the reaction include non-polar hydrocarbon diluents such as aliphatic hydrocarbons, e.g. isobutane, pentane, hexane, heptane, octane or liquid olefis; alicyclic hydrocarbon, e.g., cyclohexane; and aromatic hydrocarbons, e.g., benzene, toluene, xylene; and the like. olefins;

The polymerization conditions used include the conventional conditions for slurry polymerization systems such as polymerization temperatures ranging from 0° – 120°C., preferably 50° – 110°C., under a pressure ranging from atmospheric pressure – 500 atm, preferably 1 – 200 atm, in the absence of oxygen, water, and in many cases in the presence of a suitable chain transfer agent such as hydrogen.

The polymerization can be conducted in various types of reactors such as vessel, loop and tower reactors in a continuous or batch system. The polymerization catalyst can be any conventional catalyst for polymerizing olefins. For example, when two or more olefins such as ethylene and propylene are copolymerized, a Phillips type catalyst or a Ziegler type catalyst can be used. Suitable Phillips type catalysts include catalysts of chromium oxide supported on a heat resistant metal oxide such as silica, alumina, silica-alumina, and the like. It is especially desirable to use a catalyst system consisting of one of said catalysts and an organoaluminum compound. Suitable organoaluminum compounds include compounds having the formula

wherein R represents $C_{1-14}$ hydrocarbon groups, X represents a halogen atom or an OR' group (R' represents an alkyl group or an aryl group), and $n$ represents 1, 1.5, 2 or 3; or a compound having the formula

wherein R'' represents an alkyl group.

At least one organoaluminum compound can be used in the catalyst system, which includes compounds such as triethylaluminum, triisobutylaluminum, dimethylaluminum monochloride, diethylaluminum monochloride, ethylaluminum sesquichloride, ethylaluminum dichloride, diethylaluminum monoethoxide, diethylaluminum monomethoxide, diethylaluminum monomethoxide, pentamethylsiloxyalane and pentaethylsiloxyalane, and the like.

A Ziegler type catalyst can be used as the catalyst system which contains at least one transition metal compound of Groups IV–VI of the Periodic Table such as Ti, V, Zr, Cr, and the like, and an organometallic compound containing a metal from Groups I – III of the Periodic Table. In practice, a transition metal supported on a carrier, for example, the reaction product of a transition metal compound such as titanium tetrachloride with a divalent metal (e.g., magnesium) hydroxyhalide can be used together with the organoaluminum compound.

Catalyst systems containing a lower valent transition metal compound, which is a hydrocarbon insoluble solid prepared by reducing at least one transition metal compound, can also be used together with an organometallic compound.

For example, these catalyst systems include those containing a solid prepared by reducing a transition metal halide such as titanium tetrachloride with aluminum metal, combined with an organometallic compound; those containing a solid prepared by reducing a transition metal halide with an organometallic compound, combined with an organometallic compound; those containing a catalyst component prepared by reducing a mixture of a titanium compound such as a titanium halide and a pentavalent vanadium compound with an alkyl aluminum monohalide combined with an organometallic compound, those containing a solid prepared by reducing a reaction mixture of a titanium tetrahalide and a vanadium oxyalcoholate with an organometallic compound combined with an organoaluminum compound; and those containing a solid prepared by treating a reaction mixture of a titanium compound and a vanadium compound with an organotin compound and an aluminum halide combined with an organometallic compound.

The amount of catalyst employed is in the range of 0.01 – 25 mg/l, preferably 0.1 – 10 mg/l, of Cr to the diluent when a Phillips type catalyst is used. If an organoaluminum compound is used, amounts ranging from 0.1 – 100 mg/l, preferably 0.01 – 30 mg/l, of the compound to the diluent are used. On the other hand, if a Ziegler type catalyst is used, amounts of the transition metal compound ranging from 0.1 – 40 mg/l, preferably 0.5 – 20 mg/l, and amounts of the organoaluminum compound ranging from 0.1 – 200 mg/l, preferably 1 – 30 mg/l of Al are used.

This invention is characterized by the addition of a modifier of a polyvalent metal salt of an organic acid with a total molecular weight greater than 300, in the slurry polymerization system for the polymerization of olefins. Suitable polyvalent metal salts include aliphatic, alicyclic and aromatic carboxylic acid salts and sulfonic acid salts. The molecular weights of these salts is greater than 300. Suitable polyvalent metals include alkaline earth metals, magnesium, copper, zinc, cadmium, aluminum, lead, chromium, molybdenum, manganese, and the like. Suitable polyvalent metal salts of the organic acids include higher fatty acid salts such as calcium oleate and magnesium oleate; alkyl substituted aromatic carboxylic acid salts such as diisopropylsalicylate, alkylsalicylates having long chain alkyl groups of the formula

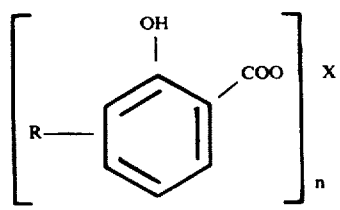

wherein R respresents long chain, $C_{14}$-$C_{18}$ alkyl groups, X represents a poly-valent metal and n represents the valence of the metal; and dialkyl aliphatic dicarboxylate sulfonates such as dioctylsulfosuccinate

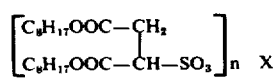

wherein X and n are defined as above. Preferably, alkyl salicylates containing at least one alkyl group with more than 8 carbon atoms and a metal with an atomic number of 21 – 29, for example, chromium alkyl salicylate having at least one $C_{14-18}$ alkyl group are used.

It is especially desirable to use a mixture of the alkyl salicylic acid salt and a divalent metal salt of a dialkyl sulfo-dicarboxylate, such as calcium dioctyl sulfo-succinate or calcium didecyl sulfosuccinate.

It is also possible to use a modifier of a polyvalent metal salt of an amide with the formula

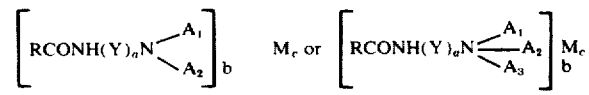

wherein R represents a hydrocarbon group; Y represents —$CH_2$— or —$CH_2OCH_2CH_2$—; $A_1$, $A_2$, and $A_3$ are the same or different and represent (CHR' CHR'O)$_p$ H (p is an integer and R' is a hydrogen atom or a lower alkyl group) or an aniomic group containing a carboxyl group wherein at least one of the $A_1$, $A_2$ and $A_3$ groups is an anionic group; M represents a polyvalent metal; a, b, and c represent integers. The anionic group can be introduced into the modifier by reacting it with an amphoteric agent such as monochloroacetic acid, monochlorosuccinic acid or maleic anhydride. These polyvalent metal salts can also be used as mixtures. It is also possible to use the modifier together with a polymer electrolyte.

Suitable electrolytes include polymers of unsaturated carboxylic acids or substitutes thereof such as copolymers of stearyl methacrylate and methacrylic acid; copolymers of β-hydroxyethyl methacrylate, stearyl methacrylate and methacrylic acid; organic base polymers or copolymers of organic bases and unsaturated carboxylic acids or substitutes thereof such as a copolymer of ethylene imine; a polymer of 2-methyl-5-vinyl-pyridine; a copolymer of 2-methyl-5-vinylpyridine, lauryl methacrylate and stearyl methacrylate; a copolymer of lauryl methacrylate, stearyl methacrylate, methylmethacrylate and 2-methyl-5-vinylpyridine. It is especially desirable to use the copolymer of 2-methyl-5-vinylpyridine and an alkyl methacrylate containing a $C_{16-18}$ alkyl group.

The amount of the polyvalent metal modifier salt used is in the range of 0.003 – 200 mg/l, preferably 0.005 – 30 mg/l, especially 0.01 – 2 mg/l, in the diluent. Adhesion and deposition of the resulting polymer on the walls of the reactor can be prevented by adding the indicated amount of the modifier. If a polymer electrolyte is added together with the polyvalent metal slat, the amount of polymer electrolyte used is in the range of 0.001 – 200 mg/l in the diluent.

The point at which the polyvalent metal salt modifier is added, is not critical. The modifier can be added to the diluent before initiation of the polymerization, or at the time of the initiation of the polymerization. It may also be suitably added after the initiation of the polymerization. Before the continuous polymerization is conducted, the catalyst may be reacted with an olefin under desirable polymerization conditions to yield a catalyst-polymer containing 0.1 – 200 g, preferably 1 – 100 g of the polymer per 1 g of the catalyst. It is preferable to continuously polymerize an olefin by adding the catalyst-polymer mixture to the polyvalent metal salt together with an auxiliary catalyst such as an organoaluminum compound.

In accordance with the process of the invention, it is possible to prevent deposition and adhesion of the resulting polymer to the inner walls of the reactor or the stirrer when an olefin such as ethylene or a mixture of ethylene and another olefin is polymerized in a slurry polymerization system. Thus, it is possible to prevent a decrease in the heat-conductivity of the wall caused by the deposition of the polymer. As a result, it is possible to conduct a stable, continuous polymerization reaction for a long period of time. When the polymer produced by the conventional process is deposited on the inner walls of the reactor and the stirrer, a portion of the polymer peels and is mixed with the slurry which results in a deterioration of the characteristics of the product. In accordance with the process of this invention, it is possible to prepare a polyolefin such as a homopolymer of ethylene and a copolymer of ethylene and propylene containing less than 10 wt% propylene which has characteristics suitable for industrial use that do not deteriorate.

Having now generally described this invention, a further understanding can be obtained by reference to certain specific examples which are provided herein for purposes of illustration only and are not intended to be limiting unless otherwise specified.

EXAMPLE 1

Ethylene was continuously polymerized in a polymerization reactor in a diluent of hexane containing $TiCl_3 \cdot 1/3 AlCl_3$ (a cocrystalline composition of titanium trichloride and aluminum trichloride) and triethylaluminum as a catalyst at 75°C. under the total pressure of 110 kg/cm$^2$ in the presence of hydrogen. In the polymerization reaction, the catalyst feed rate was controlled to feed a concentration of 6.6 mg/l of $TiCl_3 \cdot 1/3 AlCl_3$ and 40 mg/l of triethylaluminum in hexane. In addition, a modifier solution consisting of 20 wt% chromium alkylsalicylate containing alkyl groups with 14 – 18 carbon atoms, 10 wt% calcium di-2-ethylhexyl sulfosuccinate, 45 wt% of a high molecular weight electrolyte (a copolymer of 2-methyl-5-vinylpyridine and $C_{17}$ alkyl methacrylate) and 25 wt% xylene was supplied into the reactor. The feed rate of the modifier solution was controlled to feed the modifier in the concentration of 5 mg/l in hexane. As a result, polyethylene was obtained at the rate of 35 kg/hour. In accordance with this operation, normal operating conditions could be continuously conducted for more than 30 days with no substantial deposition of the polymer on the walls of the reactor. If the resulting polymer was cast into a film, almost no fish-eyes were found.

REFERENCE 1

The process of Example 1 was followed except that no modifier was supplied and the mixture was polymerized under the total pressure of 50 kg/cm$^2$. The ethylene present was continuously polymerized. After 2 days of the continuous polymerization, large amounts of the resulting polymer were deposited on the walls of the reactor so that heat-conductivity was decreased and heat-exchange was prevented. As a result, all operations had to be stopped. If the resulting polymer was cast into a film, many fish-eyes were found in the film which prevented any practical use of the film.

EXAMPLE 2

Ethylene was polymerized at 80°C. under the total pressure of 2 kg/cm$^2$ in the presence of $TiCl_3 \cdot 1/3 AlCl_3$ and triethylaluminum as the catalyst in cyclohexane. The resulting polymer was washed with hexane to yield a catalyst-polyethylene mixture containing 50 g of polyethylene per 1 g of $TiCl_3 \cdot 1/3 AlCl_3$.

In a continuous polymerization reactor, ethylene was continuously polymerized at 75°C. under the total pressure of 55 kg/cm$^2$ in a diluent of hexane containing said catalyst-polyethylene mixture and triethylaluminum as a catalyst in the presence of hydrogen.

In the polymerization reaction, the catalyst feed rate was controlled to feed the catalyst-polyethylene mixture and triethylaluminum in concentrations of 330 mg/l and 40 mg/l respectively in hexane. In addition, the modifiers of Example 1 were admitted into the reactor in a concentration of 5 mg/l of the modifier in hexane. As a result, polyethylene was obtained at the rate of 35 kg/hour. Normal operating conditions could be continuously conducted for more than 30 days, and essentially no deposition of the polymer on the walls of the reactor was found.

REFERENCE 2

The process of Example 2 was followed except that no modifier was supplied to the reaction mixture. Although the same polymerization rate was at first obtained, after 2 days, large amounts of the resulting polymer were deposited on the walls of the reactor. Thus, the heat-conductivity decreased and heat-exchange was impeded sufficiently so as to force a cessation of the polymerization operation.

EXAMPLE 3

The process of Example 1 was followed except that the continuous polymerization of ethylene was conducted at 60°C. under a total pressure of 240 kg/cm$^2$. Normal polymerization operations could be continuously conducted for more than 30 days. As a reference experiment, the same polymerization reaction was conducted except that no modifier was supplied and the polymerization was conducted under a total pressure of 120 kg/cm$^2$. If the continuous operation was performed for one half day, productivity decreased and the normal polymerization operations could not be continued. As a result, all operations had to be stopped.

EXAMPLE 4

The procedure of Example 1 was followed except that the continuous polymerization of ethylene was conducted at 90°C. under a total pressure of 52 kg/cm$^2$. Normal operating conditions could be continuously conducted for more than 30 days.

EXAMPLE 5

The procedure of Example 1 was followed except that the continuous polymerization of ethylene was conducted in a concentration of triethylaluminum of 8 mg/l or 100 mg/l. Stable normal operations could be continuously conducted for more than 30 days.

EXAMPLE 6

The procedure of Example 1 was followed except that the continuous polymerization of ethylene was conducted under conditions in which the concentration of the modifier in a hexane solution was charged to 2 mg/l or 3 mg/l. Normal operating conditions could be continuously conducted for more than 30 days with no substantial deposition of the polymer on the walls of the reactor.

EXAMPLE 7

The procedure of Example 1 was followed except that the continuous polymerization of ethylene was conducted under a total pressure of 122 kg/cm² in the presence of a modifier in a concentration of 7 mg/l in hexane, wherein the modifier solution contained 20 wt% chromium (trivalent) $C_{14-18}$ alkyl salicylate, 10 wt% calcium di-2-ethylhexyl sulfo-succinate and 7 wt% xylene. Normal operating conditions were continuously conducted for more than 30 days with no substantial deposition of the polymer on the walls of the reactor.

EXAMPLE 8

The procedure of Example 1 was followed except that the continuous polymerization of ethylene was conducted under a total pressure of 150 kg/cm² in the presence of a modifier in the concentration of 15 mg/l in hexane, wherein the modifier solution contained 20 wt% chromium (trivalent) $C_{14-18}$ alkyl salicylate and 80 wt% xylene. Normal operating conditions could be continuously conducted for more than 30 days with no substantial deposition of the polymer on the walls of the reactor.

EXAMPLE 9

In a continuous polymerization reactor, ethylene was continuously polymerized at 90°C. under a total pressure of 260 kg/cm² in a diluent of hexane. A reaction product of magnesium hydroxychloride with titanium tetrachloride and triisobutylaluminum was used as the catalyst in the presence of hydrogen.

In the polymerization reaction, the catalyst feed rate was controlled to feed a concentration of 6.6 mg/l of a titanium compound and 50 mg/l of triisobutylaluminum in hexane. Into the reactor, a concentration of 5 mg/l of the modifier of Example 1 in hexane was supplied. Stable continuous operation could be conducted for more than 30 days.

As a reference experiment, the same polymerization was conducted except that no modifier was supplied and the polymerization was conducted under the total pressure of 130 kg/cm². If a continuous operation was performed for about 2 days, productivity decreased and normal operating conditions could not be maintained. As a result, all operations were stopped.

EXAMPLE 10

A reaction mixture of n-propyl titanate with vanadium oxychloride was reduced in cyclohexane with di-ethylaluminum chloride to yield a hydrocarbon insoluble reaction product. In a continuous polymerization reactor, ethylene was polymerized at 90°C. under a total pressure of 24 kg/cm² in a diluent of hexane wherein said hydrocarbon insoluble reaction product and triethylaluminum were used as the catalyst system in the presence of hydrogen. The catalyst feed rate was controlled to feed a concentration of 7.0 mg/l of said hydrocarbon insoluble reaction product and 50 mg/l of triethylaluminum in hexane. In the reactor, 5 mg/l, of the modifier solution of Example 1 in hexane was supplied. Stable continuous operations could be conducted for more than 30 days.

As a reference experiment, the same polymerization reaction was conducted except that no modifier was supplied and the polymerization was conducted under a total pressure of 12 kg/cm². If continuous operations were conducted for about 2 days, productivity decreased and normal operating conditions could not be maintained. As a result, all operations were stopped.

EXAMPLE 11

A reaction mixture of titanium tetrachloride with vanadyl tri-n-butoxide was reduced in cyclohexane with ethylaluminum sesquichloride to yield a hydrocarbon insoluble reaction product. Ethylene was polymerized at 80°C. under a total pressure of 2 kg/cm² in the presence of a catalyst of said hydrocarbon insoluble reaction product and triethylaluminum and a hydrocarbon.

The resulting product was washed with hexane to yield a catalyst-polyethylene mixture containing 50 g of polyethylene per 1 g of the hydrocarbon insoluble reaction product. In a continuous polymerization reactor, ethylene was polymerized at 75° C. under a total pressure of 11 kg/cm² in a diluent of hexane in the presence of said catalyst-polyethylene mixture and triethylaluminum as the catalyst and hydrogen. The catalyst feed rate was controlled to feed a concentration of 330 mg/l of said catalyst-polyethylene mixture and 40 mg/l of triethylaluminum in hexane.

Into the reactor was supplied 3 mg/l of the modifier solution of Example 1 in hexane. As a result, polyethylene was obtained at the rate of 35 kg/hour. Stable continuous operations could be conducted for more than 30 days.

As a reference experiment, the same polymerization reaction was conducted except that no modifier was supplied. Although polyethylene was produced at the same rate, the polymer was deposited on the walls of the reactor so that heat-conductivity decreased and heat-exchange was prevented. Thus, all operations had to be stopped after about 2 days.

EXAMPLE 12

A reaction mixture of titanium tetrachloride with vanadyl tri-n-butoxide was reduced in cyclohexane with a mixture of aluminum trichloride and tri-n-butyltin chloride to yield a hydrocarbon insoluble reaction product.

The procedures of Example 1 was followed except that said hydrocarbon insoluble reaction product and triethylaluminum were used as the catalyst, and the continuous polymerization of ethylene was conducted under the total pressure of 11 kg/cm². Stable continuous operations could be conducted for more than 30 days.

EXAMPLE 13

An aqueous solution of chromium trioxide was adsorbed on silica. The impregnated carrier was dried at 120°C. and then activated at 800°C. to yield a silica-chromium oxide catalyst containing 1 wt% chromium. Ethylene was continuously polymerized at 90° C. under a total pressure of 26 kg/cm² in the presence of said silica-chromium oxide catalyst. In the polymerization, the catalyst feed rate was controlled to feed a concentration of 48 mg/l of said catalyst. In addition 5 mg/l of the modifier solution of Example 1 in hexane was supplied to the reactor. Stable continuous operations could be conducted for more than 30 days.

As a reference experiment, the same polymerization reaction was conducted, except that no modifier was supplied and the polymerization was conducted under the total pressure of 13 kg/cm². When a continuous operation was conducted for about 2 days, productivity decreased and normal operating conditions could not be maintained. As a result, all operations had to be stopped.

EXAMPLE 14

An aqueous solution of chromium oxide was adsorbed on silica. The impregnated carrier was dried at 120° C. and then was activated at 800° C. to yield a silica-chromium oxide catalyst containing 1 wt% chromium. Ethylene was polymerized at 80° C. under a total pressure of 2 kg/cm² in hexane in the presence of the silica-chromium oxide catalyst. The resulting product was washed with hexane to to yield a catalyst-polyethylene mixture containing 5 g of polyethylene per 1 g of the silica-chromium oxide catalyst.

Ethylene was continuously polymerized at 90° C. under a total pressure of 13 kg/cm² in the presence of the catalyst-polyethylene mixture and triethylaluminum. The catalyst feed rate was controlled to feed a concentration of 289 mg/l of the catalyst polyethylene mixture and 8 mg/l of triethylaluminum in hexane. Into the reactor was supplied 5 mg/l of the modifier solution of Example 1 in hexane. As a result, polyethylene was obtained at the rate of 35 kg/hour, and stable continuous operations could be conducted for more than 30 days.

As a reference experiment, the same polymerization reaction was conducted except that no modifier was supplied to yield polyethylene at the same rate. Productivity decreased after 2 days of continuous operation. As a result, all operations had to be stopped.

EXAMPLE 15

An aqueous solution of chromium oxide was adsorbed on silica. The impregnated carrier was dried at 120° C. and then was activated at 800° C. to yield a silica-chromium oxide containing 1 wt% activated chromium. Ethylene was polymerized at 80° C. under a total pressure of 2 kg/cm² in hexane in the presence of silica-chromium oxide and diethylaluminum monoethoxide as the catalyst. The resulting product was washed with hexane to yield a catalyst-polyethylene mixture containing 5 g of polyethylene per 1 g of the silica-chromium oxide catalyst.

Ethylene was continuously polymerized at 90° C. under a total pressure of 11 kg/cm² in the presence of the catalyst-polyethylene mixture and diethylaluminum monoethoxide as the catalyst. The catalyst feed rate was controlled to feed a concentration of 289 mg/l of the catalyst-polyethylene mixture and 8 mg/l of diethylaluminum monoethoxide. A 5 mg/l quantity of the modifier solution of Example 1 in hexane was supplied to the reactor. Polyethylene was obtained at the rate of 35 kg/hour, and stable continuous operations could be conducted for more than 30 days.

As a reference experiment, the same polymerization reaction was conducted except that no modifier was supplied to yield polyethylene at the same rate. Productivity decreased after 2 days of continuous operation. As a result, all operations had to be stopped.

EXAMPLE 16

20 parts by weight of $TiCl_3 \cdot 1/3AlCl_3$ was admixed with 1.5 parts by weight of hexamethylphosphoric triamide, and the mixture was crushed to yield a modified catalyst component. Propylene was continuously polymerized in hexane as a diluent at 80° C. under a total pressure of 37 kg/cm² in the presence of a catalyst consisting of 12 mg/l of the modified catalyst component, 140 mg/l of triisobutylaluminum, 40 mg/l of diethylaluminum monochloride, 12 mg/l of tri-n-butylphosphine and 15 mg/l of hexamethylphosphoric triamide together with 5 mg/l of the modifier solution of Example 1. As a result, crystalline polypropylene was obtained at the rate of 10 kg/hour, and stable operations could be continuously conducted for more than 30 days.

EXAMPLE 17

The procedure of Example 15 was followed except that the concentration of diethylaluminum monoethoxide used was 8 mg/l or 20 mg/l Alternatively, the original 5 g amount of the catalystpolyethylene mixture was changed to a 0.5 g quantity. Normal operating conditions could be continuously conducted for more than 30 days.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In a process for polymerizing an olefin by a slurry polymerization technique in a non-polar hydrocarbon diluent in the absence of oxygen and water in the presence of:

a. a Phillips catalyst of chromium oxide supported on a heat-resistant metal oxide or chromium oxide supported on a heat-resistant metal oxide with an organoaluminum compound, wherein the concentration of said catalyst ranges from 0.01 – 25 mg/l of Cr in said diluent and the concentration of said organoaluminum compound ranges from 0.01 – 30 mg/l; or b. a Ziegler catalyst of a transition metal compound of Groups IV–VI of the Periodic Table with an organoaluminum compound supported on a carrier or a lower valent transition metal compound of Groups IV–VI of the Periodic Table with an organoaluminum compound, wherein the amount of said transition metal compound ranges from 0.5 – 20 mg/l in said diluent and the amount of said organoaluminum compound in said diluent ranges from 0.1 –200 mg/l, the improvement which comprises:

adding a modifier of a polyvalent metal salt having a molecular weight of at least 300 of an organic acid consisting of a mixture of polyvalent metal $C_{14-18}$ alkylsalicylates and a polyvalent metal alkyl aliphatic dicarboxylate sulfonate, wherein the concentration of said polyvalent metal salt modifier ranges from 0.01 – 2 mg/l in said diluent.

2. The process according to claim 1, wherein the olefin is polymerized at 0°–120° C. under a pressure of 1 – 500 atm.

3. The process according to claim 1, wherein the polyvalent metal of said polyvalent metal salt is selected from the group consisting of alkaline earth metals, copper, zinc, cadmium, aluminum, lead, chromium, molybdenum and manganese.

4. The process according to claim 1, wherein the polyvalent metal of said polyvalent metal alkyl salicylate is chromium.

5. The process according to claim 4, wherein one component of the modifier is the calcium dioctyl ester of sulfosuccinate or the calcium didecyl ester of sulfosuccinate.

6. The process according to claim 1, wherein a polymer electrolyte selected from the group consisting of polymers of unsaturated carboxylic acids a copolymer of ethylene imine and homo and copolymers of 2-methyl-5-vinylpyridine is added to the slurry polymerization medium together with the polyvalent metal salt.

7. The process of claim 6 wherein the electrolyte is a copolymer of 2-methyl-5-vinylpyridine, lauryl methacrylate and stearyl methacrylate.

8. The process of claim 6 wherein the electrolyte is a copolymer of 2-methyl-5-vinylpyridine, lauryl methacrylate, stearyl methacrylate and methyl methacrylate.

9. The process according to claim 1, wherein a catalyst-polymer mixture containing 0.1 – 200 g of the polymer per 1 g of the catalyst which is prepared by polymerizing an olefin in the presence of the catalyst is added to the slurry polymerization medium.

10. The process of claim 1, wherein said modifier is a mixture of said polyvalent metal $C_{14-18}$ alkylsalicylate and calcium dioctyl sulfosuccinate or calcium didecyl sulfo-succinate.

11. The process of claim 10, wherein said modifier is a solution containing 20 wt % chromium $C_{14-18}$ alkyl salicylate and 10 wt % calcium di-2-ethylhexylsulfosuccinate.

* * * * *